US012613409B2

(12) United States Patent
Labroille

(10) Patent No.: US 12,613,409 B2
(45) Date of Patent: Apr. 28, 2026

(54) SYSTEM FOR COMPENSATING FOR THE DISTORTION OF A WAVEFRONT OF AN INCIDENT LIGHT BEAM

(71) Applicant: CAILabs, Rennes (FR)

(72) Inventor: Guillaume Labroille, Rennes (FR)

(73) Assignee: CAILabs, Rennes (FR)

( * ) Notice: Subject to any disclaimer, the term of this patent is extended or adjusted under 35 U.S.C. 154(b) by 396 days.

(21) Appl. No.: 18/549,112

(22) PCT Filed: Mar. 4, 2022

(86) PCT No.: PCT/FR2022/050394
§ 371 (c)(1),
(2) Date: Sep. 5, 2023

(87) PCT Pub. No.: WO2022/185020
PCT Pub. Date: Sep. 9, 2022

(65) Prior Publication Data
US 2024/0151962 A1 May 9, 2024

(30) Foreign Application Priority Data
Mar. 4, 2021 (FR) ....................................... 2102127

(51) Int. Cl.
*G02B 27/00* (2006.01)
*G02B 26/08* (2006.01)

(52) U.S. Cl.
CPC ..... *G02B 27/0068* (2013.01); *G02B 26/0825* (2013.01)

(58) Field of Classification Search
CPC ......................... G02B 27/0068; G02B 26/0825
(Continued)

(56) References Cited

U.S. PATENT DOCUMENTS 7,974,543 B2 7/2011 Khurgin et al.
9,250,454 B2 2/2016 Morizur et al.
(Continued)

FOREIGN PATENT DOCUMENTS

EP 3119019 A1 1/2017
EP 3672109 A1 6/2020
(Continued)

OTHER PUBLICATIONS

Ramon et al., Alternative Passive Fiber Coupling System Based on Multi-Plane Light Conversion for Satellite-to-Ground Communications, Proceedings of the SPIE, vol. 11272, (2020). (Year: 2020).*
(Continued)

*Primary Examiner* — Balram T Parbadia
*Assistant Examiner* — Mitchell T Oestreich
(74) *Attorney, Agent, or Firm* — TraskBritt

(57) ABSTRACT

A system for compensating for the distortion of a wavefront of one portion at least of an incident light beam comprises: —an adaptive optic for providing, via reflection from an active surface, a corrected light beam; —a mode splitter for providing a plurality of output light beams belonging to a family of target modes; —a photonic device that is optically coupled to the mode splitter, the photonic device being configured to deliver: i. a useful light beam; ii. quantities representative of the characteristics of the output light beams; —a controller of the adaptive optic, the controller being connected to the photonic device and to the adaptive optic, the controller being configured to, on the basis of the quantities, adjust the deformation of the active surface.

16 Claims, 7 Drawing Sheets

(58) Field of Classification Search
USPC ...................................................... 359/212.1
See application file for complete search history.

(56)                    References Cited

U.S. PATENT DOCUMENTS

| 10,313,011 | B2 | 6/2019 | Takahashi et al. |
| 10,411,802 | B2 | 9/2019 | Tanaka et al. |
| 10,892,824 | B2 | 1/2021 | Geisler et al. |
| 2017/0010463 | A1 | 1/2017 | Morizur et al. |

FOREIGN PATENT DOCUMENTS

| EP | 3672110 | A1 | 6/2020 |
| EP | 3748873 | | 12/2020 |
| WO | 2016/047100 | A1 | 3/2016 |
| WO | 2021/111068 | A1 | 6/2021 |
| WO | 2021/177832 | A1 | 9/2021 |

OTHER PUBLICATIONS

Cailabs, Laser communications without Adaptive Optics, Demonstrated by NEC corporation in 1Arikawa & al, Sum. Top. (2016) & 2Arikawa & al, ECOC (2017), 2 pages.
Neil et al., Closed-Loop Aberration Correction by Use of a Model Zernike Wave-Front Sensor, Optics Letters, vol. 25, No. 15, (Aug. 1, 2000), pp. 1083-1085.
Neil et al., Closed-Loop Aberration Correction by Use of modal Zernike Wave-Front Sensor, Optics Letters, vol. 25, No. 15, (Aug. 1, 2000), pp. 1083-1085.
Neil et al., New Modal Wave-Front Sensor: A Theoretical Analysis, J. Opt. Soc. AM. A/vol. 17, No. 6, (Jun. 2000), pp. 1098-1107.
Ribak et al., A Fast modal Wave-Front Sensor, Optics Express, vol. 9, No. 3, (Jul. 30, 2001, pp. 152-157.
Stein et al., Novel Wavefront Sensing Strategies for Strong Atmospheric Turbulence, OECD Conference Center, (Jan. 2-4, 2016), 5 pages.
International Search Report for Application No. PCT/FR2022/050394 dated Jun. 22, 2023, 2 pages.
International Written Opinion for Application No. PCT/FR2022/050394 dated Jun. 22, 2023, 2 pages.
Morizur et al., Programmable Unitary Spatial Mode Manipulation, J. Opt. Soc. Am. A/vol. 27, No. 11, (Nov. 2010, 8 pages.
Norris et al., An All-Photonic Focal-Plane Wavefront Sensor. Nat Commun,m., vol. 11, 5335 (2020).
Ramon et al., Alternative Passive Fiber Coupling System Based on Multi-Plane Light Conversion for Satellite-to-Ground Communications, Proceedings of the SPIE, vol. 11272, (2020).
Song et al., Experimental Mitigation of Atmospheric Turbulence Effect Using Pre-Signal Combining for Uni-and Bi-Directional Free-Space Optical Links with Two 100 Gbit/s OAM-Multiplexed Channels, Journal of Lightwave Technology, vol. 38, Issue 1, (Jan. 1, 2020).
Song et al., Simultaneous Turbulence Mitigation and Channel Demultiplexing Using a Single Multi-Plane, Optics Communications, vol. 501, (Dec. 2021).
Fontaine et al., Design of High Order Mode-Multiplexers Using Multiplane Light Conversion, European Conference on Optical Communication (ECOC), (Sep. 17-21, 2017), 3 pages.

* cited by examiner

SYSTEM FOR COMPENSATING FOR THE DISTORTION OF A WAVEFRONT OF AN INCIDENT LIGHT BEAM

CROSS REFERENCE TO RELATED APPLICATIONS

This application is a national phase entry under 35 U.S.C. § 371 of International Patent Application PCT/FR2022/050394, filed Mar. 4, 2022, designating the United States of America and published as International Patent Publication WO 2022/185020 A1 on Sep. 9, 2022, which claims the benefit under Article 8 of the Patent Cooperation Treaty to French Patent Application Serial No. FR2102127, filed Mar. 4, 2021.

TECHNICAL FIELD

The present disclosure relates to a system for compensating for the distortion of the wavefront of a light beam. This distortion may originate in atmospheric disturbances during an optical communication in free space. More generally, this distortion is caused by the propagation of the light beam in its medium. The present disclosure may find an application, in particular, in the field of telecommunications, microscopy or the field of medical imaging.

BACKGROUND

The propagation of a light beam in free space subjects that beam to atmospheric disturbances. These erratic disturbances, the variation dynamics of which is on the order of one kHz, lead to the deformation of this beam, which affects its wavefront.

FIG. 1 shows an assembly of the state of the art aimed at compensating for the phase distortion that the atmospheric disturbances PA induce on the wavefront. In the assembly of FIG. 1, a telescope T collects a part of the incident light beam I, possibly with the assistance of other optical elements, to project it onto a deformable mirror AO.

Such a deformable mirror, in its use as an adaptive optic, is controllable to locally (spatially) deform its active surface and adjust the phase of the incident light beam. It can thus be sought to compensate for the distortion of the wavefront caused by atmospheric disturbances PA. To this end, the assembly comprises, arranged in a regulation loop, a wavefront analyzer K and a controller of the deformable mirror CTRL. The bandwidth of the deformable mirror AO, that is to say the frequency with which it is possible to control its deformation, is on the order of 10 kHZ or a few tens of kHz for the systems currently available, or an order of magnitude greater than the meteorological phenomena for which it is supposed to compensate.

Continuing the description of the assembly of the prior art shown in FIG. 1, a part of the light beam reflected by the deformable mirror AO, and therefore whose distortion is reduced, is directed using a splitter BS, on an optical receiver OR to be analyzed therein, and more generally used, for example, by means of a multimode MMF optical fiber or a single-mode optical fiber. The other part is directed by the splitter BS to the wavefront analyzer K.

This assembly of the prior art has numerous limitations. Firstly, a relatively large part of the light beam is redirected by the splitter BS to be used by the wavefront analyzer of the feedback loop. It follows that the power of the "useful" light beam, directed toward the optical receiver OR, is reduced, which is detrimental to the proper usage of this light beam.

This is all the more critical as, in the application to optical telecommunications taken as an example, the captured part of the incident beam I may be of very low energy. Any energy loss leads to increasing the signal-to-noise ratio of the transmission and therefore the bandwidth of the telecommunication system.

The wavefront analyzer K further constitutes a particularly complex item of equipment. It generally comprises a camera, for example, of the CCD type, preparing digital images of a beam previously conditioned by a plurality of optical pieces. The images are then digitally processed to measure the spatial phase of the perceived light beam. This spatial phase information is broken down by the analyzer K or by the controller CTRL into elementary deformations applicable to the deformable mirror in order to compensate for the aberrations of the incident beam I.

The complexity of the processing operations carried out by the analyzer and/or by the deformable mirror controller, in particular when the camera has a significant pixel resolution for more processing precision, necessarily introduces a processing delay in the feedback loop, which limits the precision of the compensation, or even renders this compensation unstable. Generally therefore, the conventional solutions for compensating for the distortion of a wavefront are not very satisfactory for communication with a high flow rate and can be costly.

New approaches seek to eliminate the conventional wavefront analyzer of the assembly shown in FIG. 1.

The TILBA device from the company CAILABS is thus known, which seeks to eliminate the adaptive optic and its regulation loop to provide the most complete useful beam possible to the optical receiver. This device decomposes the incident beam (which, due to atmospheric disturbances, has a very degraded and variable shape) in a limited number of spatial modes. This decomposition can be carried out by a multi-plane light converter and each decomposed mode is injected into a single-mode fiber. It is possible to collect, by way of the higher modes of the decomposition device, the spatial components contributing to the "degraded" shape of the incident beam. This approach is documented in the article "Alternative passive fiber coupling System based on MPLC for satellite to ground conversion," Free communication laser XXXII, Mar. 9, 2020, page 25.

The document Norris, B. R. M., Wei, J., Betters, C. H. et al., An all-photonic focal-plane wavefront sensor. *Nat. Commun.* 11, 5335 (2020), teaches a solution aiming to replace, in the principal diagram of FIG. 1, the wavefront analyzer by a photonic lantern. The beam received at the input by this lantern propagates, on the side of its output, in a multi-core optical fiber section, each core propagating a particular mode. The spatial pattern defined by the intensity of the light beam coming from the cores, at the output of this fiber, is used to control the deformable mirror AO. More specifically, this document provides for training a neural network using training data associating a determined spatial pattern (corresponding to a determined aberration of the wavefront) with a determined deformation of the deformable mirror (aiming to compensate for the determined aberration of the wavefront).

This proposal that finds an application in the aforementioned article in the field of astronomy suffers, however, from numerous problems. Firstly, it does not eliminate the need to use a camera. Moreover, the photonic lantern is a highly unstable device, which is not in perfect control of the transfer function, that is to say the precise way according to which the incident light beam is broken down to propagate within the cores of the multicore optical fiber section. This transfer function is particularly sensitive to temperature or more generally to its environment, so that the solution proposed by this article requires regularly training the neural network to take these deviations into account. Furthermore, as the lantern forms a multimode waveguide, the incident beam propagating therein necessarily undergoes a temporal dispersion that would limit the transmission rate if such a device was used in the telecommunications field. In addition, and more generally, the transfer function of the photonic lantern is dependent on the wavelength and on the polarization of the incident beam. When the beam provided by such a lantern is used to control the deformable mirror AO it is not possible to determine a single configuration of this mirror that is adapted to all the wavelengths and/or to all the polarizations of the incident beam, when this beam extends over the entire range of wavelengths/polarization. This chromatic dispersion constitutes a large barrier for the use of this solution in numerous fields, such as that of telecommunications, which traditionally uses wavelength-multiplexed and/or polarization-multiplexed techniques.

The solution proposed by this document is therefore imperfect.

BRIEF SUMMARY

One object of the present disclosure is to propose a solution that at least partially overcomes the aforementioned drawbacks.

In order to achieve this aim, the subject matter of the present disclosure proposes a system for compensating for the distortion of a wavefront of at least part of an incident light beam.

According to the present disclosure, the compensating system comprises:

an adaptive optic comprising an active surface configured to receive the portion of the incident light beam and provide, via reflection from the active surface, a corrected light beam;

a mode splitter disposed in the propagation path of the corrected light beam, configured to provide a plurality of output light beams conforming to a family of target modes, the mode splitter comprising a plurality of microstructured zones disposed on at least one optical element configured to spatially intercept and modify the corrected light beam, during a plurality of reflections or transmission from the plurality of microstructured zones separated by a free propagation;

a photonic device optically coupled to the mode splitter, the photonic device being configured to provide:

i. a light beam said to be "useful," representative of the corrected light beam, from the output light beams, the useful light beam being particularly intended to be transmitted to an optical receiver;

ii. Quantities, designated "mode characteristics," representative of the characteristics of the output light beams;

A controller of the adaptive optic, connected to the photonic device and to the adaptive optic, the controller being configured to, from the mode characteristics, adjust the deformation of the active surface.

According to other advantageous and non-limiting features of the present disclosure, either individually or in any technically feasible combination:

the useful light beam corresponds to at least part of a single output light beam, this part being spatially separated from the other output light beams;

the useful light beam comprises a plurality of output light beams;

the photonic device is configured to recombine at least part of the output light beams to form the useful light beam;

the recombination of at least part of the output light beams is carried out by at least one multi-plane light conversion device;

the recombination of at least part of the output light beams is carried out by a photonic integrated circuit;

the photonic device comprises at least one single-mode optical fiber and is configured to inject the useful light beam therein, the photonic device comprises a plurality of photodetectors configured to measure the intensity and, optionally, the relative phase, of at least a part of the plurality of output light beams, the plurality of photodetectors providing at least some of the mode characteristics;

the mode characteristics comprise the quantities representative of the intensity and relative phase of the output light beams and the controller is configured to determine, from the mode characteristics, the phase of the wavefront of the portion of the corrected light beam;

the controller implements processing aimed at maximizing the power transmitted in the useful light beam;

the target mode family comprises a Gaussian mode base and/or a Walsh mode base;

the mode splitter comprises a plurality of multi-plane light conversion devices;

the adaptive optic is controlled to apply a temporary determined deformation to the active surface, and the mode characteristics combine the quantities representative of the characteristics of the output light beams produced with and without the temporary deformation of the active surface;

the photonic device is optically coupled to an optical amplifier of the useful light beam.

According to another aspect, the present disclosure relates to an optical communication system implementing a compensating system as described above and wherein the optical communication implements a wavelength multiplexing and/or polarization multiplexing technique.

BRIEF DESCRIPTION OF THE DRAWINGS

Other features and advantages of the present disclosure will emerge from the following detailed description of the present disclosure with reference to the appended figures, in which.

DETAILED DESCRIPTION

For the sake of clarity, in the present disclosure, "light beam" is defined as a beam formed from at least one mode of the electromagnetic field, each mode forming a spatio-frequential distribution of the amplitude, phase, and polarization of the field. Accordingly, the modification or transformation of the phase of the light beam refers to the modification or spatio-frequential transformation of each of the modes of the beam.

The "shape" of radiation means the transverse distribution of the amplitude and the phase of the mode or the combination of the transverse amplitude and phase distributions of the modes making up this beam.

Figure 1:
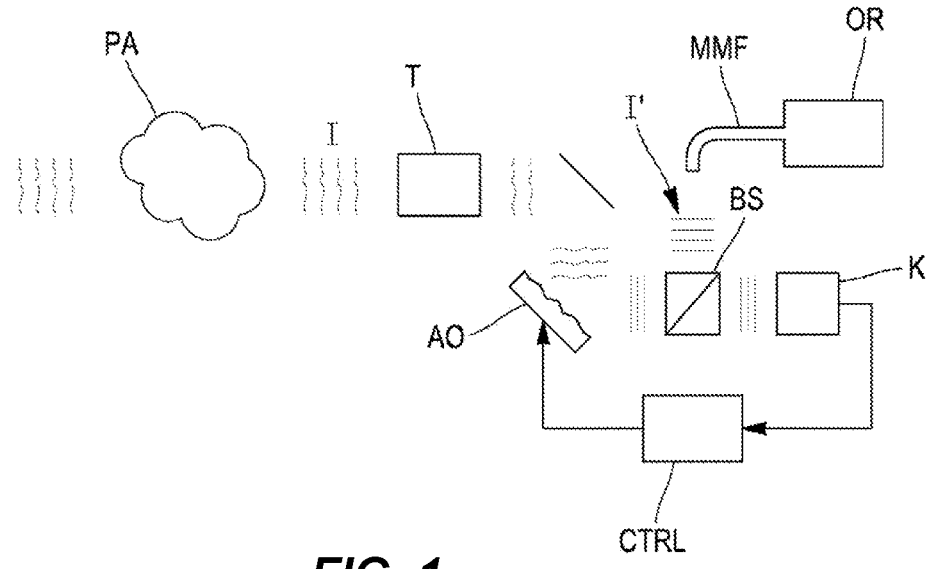
FIG. 1 shows an assembly of the state of the art aimed at compensating for the phase distortion that atmospheric disturbances induce on a wavefront.
Figure 2:
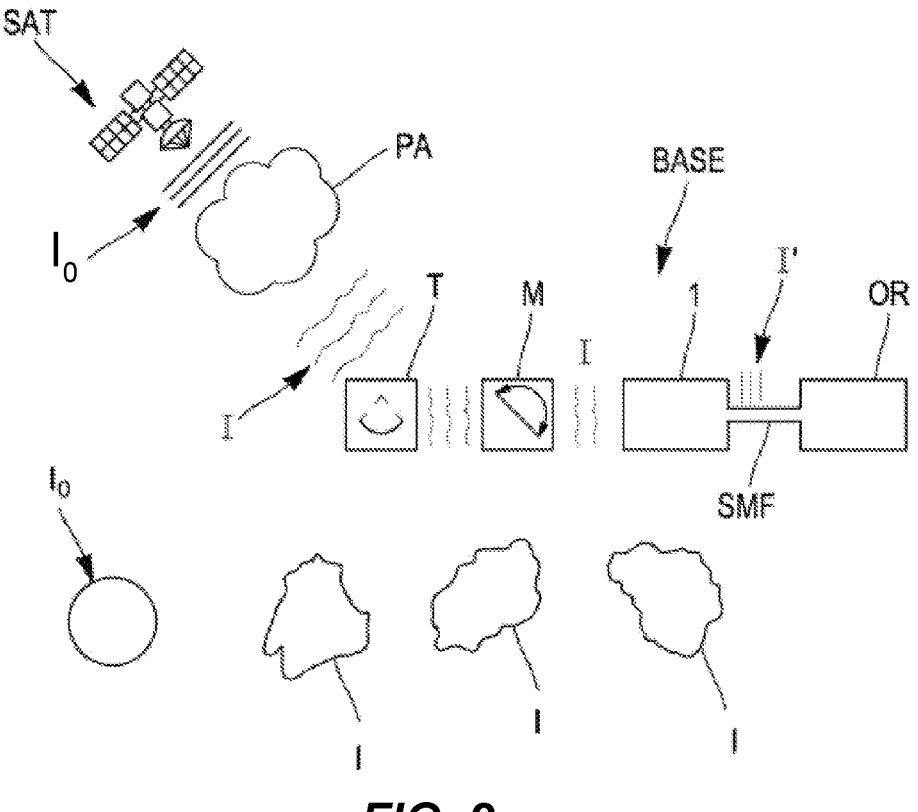
FIG. 2 shows a first example of use of a compensating system according to the present disclosure in the field of telecommunications.

Referring to FIG. 2, a first example of use in the field of optical telecommunications of a system 1 for compensating for the distortion of a wavefront according to the present disclosure is presented.

In this purely illustrative example, a transmitter SAT—here a communication satellite—emits a light beam for transmitting a message toward a base station BASE. The light beam 10 directly emitted by the satellite SAT has a regular shape 1o, as shown in the lower part of FIG. 2. During its propagation in free space, the beam emitted 10 is subjected to atmospheric disturbances of the atmosphere PA, so that the incident light beam I arriving at the base station BASE has phase aberrations leading to the distortion of its wavefront. This phenomenon affects the shape of the incident beam I, which takes a variable shape over time, erratically and irregularly. The bottom of FIG. 2 shows several examples of the irregular and variable shape of the incident beam I.

Despite this phenomenon, it is sought to use in the base station BASE the incident beam I via an optical receiver OR in order to decode the transmitted message. To this end, a telescope T is provided to collect part of the incident light beam I with the possible assistance of other optical elements such as an orientable mirror M. The incident light beam I (and more precisely the part of this beam that is collected by the telescope T) is directed toward the compensating system 1 for the distortion of the wavefront. That system seeks at least partially to compensate for this distortion in order to provide a light beam said to be "useful" I", the wavefront of which has a lower distortion than that of the incident beam I. This useful beam is guided to the optical receiver OR via a single-mode fiber SMF of the compensating system 1.

In this example application, the energy of the incident beam I received at the telescope T is generally very low, in particular because the power of the transmitter on board the satellite SAT is limited, and because of the errors of pointing, deformation, and expansion of the emitted light beam during its propagation in free space. It is therefore important, for transmission bandwidth reasons, that the compensating system 1 transmits as much of the energy collected as possible in the useful light beam I" to provide this energy to the receiver OR. The optical communication between the transmitter SAT and the optical receiver OR may in particular implement a wavelength-multiplexing or polarization-multiplexing technique. It is also necessary in this application that the compensating system 1 introduces little chromatic dispersion, or dispersion linked to the polarization of the incident light beam I.

Figure 3A:
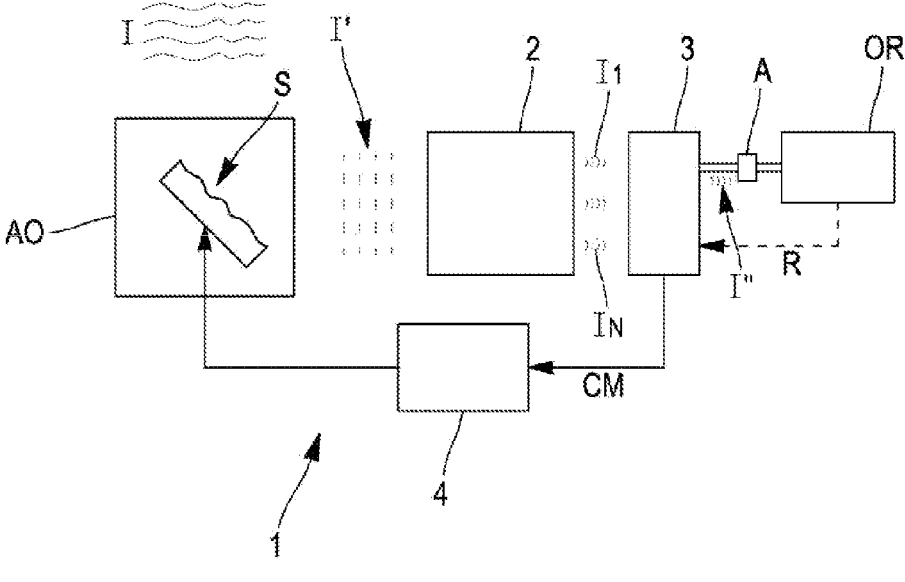
FIGS. 3A-3C represent an example of a compensating system according to the present disclosure.

With reference to FIG. 3A, a compensating system 1 can now be presented that can be used in the example application of FIG. 2, which has just been presented.

In a very general manner, the compensating system 1 implements an adaptive optic AO to compensate at least in part for the deformation of the wavefront of the incident beam I. This adaptive optic AO provides a corrected incident beam I'. The corrected incident beam I' is used to establish a useful beam I" that is guided by means of a single-mode fiber SMF to an optical receiver OR for its use, that is to say, the decoding of the transmitted message. This preparation of the useful beam is implemented by a mode splitter 2, which breaks down the corrected light beam I' into a plurality of output beams $I_1$-$I_N$, conforming to a family of target modes, of which certain characteristics are measured (such as, for example, the intensity and, optionally, the phase). The mode splitter 2 is implemented by a multi-plane light conversion device (MPLC), as will be presented in more detail in the rest of this description, based on reflections/transmissions and free propagations of the beam. This avoids the use of a waveguide and the drawbacks associated with this use as described above. The mode splitter 2 is arranged in a regulation loop making it possible to use the measured characteristics to adjust the phase shift imparted by the active surface S of the adaptive optic AO to the incident light beam I. This regulation loop aims to maximize the power supplied in the useful beam I", and comprises, in addition to the mode splitter 2, a photonic device 3, which determines the characteristics of at least part of the output beams $I_1$-$I_N$ of the splitter 2, and a controller 4 of the adaptive optic, which utilizes these characteristics to adjust the adaptive optic.

This approach is particularly advantageous. The number of output beams $I_1$-$I_N$ may be relatively low, in particular in comparison with a decomposition "into pixels" carried out by the camera of a wavefront analyzer of the prior art. Consequently, the processing operations carried out on the mode characteristics of these beams are simpler to implement and within a shorter period, which makes it possible to improve the quality of the regulation. In particular, the regulation can be made to converge and "lock" in an operating mode where a very large part of the energy of the incident beam I is projected into the useful beam I" to be used by the optical receiver OR. In this locked mode, the variations in shape of the incident beam I generated by the atmospheric disturbances are compensated by the adaptive optic AO, to permanently maximize the energy present in the useful beam I". In this way, the variations in the wavefront of the incident beam are compensated. In addition, the treatments carried out on the beam introduce little chromatic distortion or linked to the polarization of the incident beam. The approach is therefore perfectly suited to applications, such as, for example, telecommunication, where the spectral or polarization content of the incident beam must be preserved. And according to an important feature, the elements ensuring the regulation of the adaptive optic AO are not very intrusive, and it is possible to exploit a large part of the energy of the incident beam I to form the useful beam I" provided to the optical receiver RO.

Referring to the description of FIG. 3A, and in greater detail, the compensating system 1 therefore comprises an adaptive optic AO comprising an active surface S for receiving a part of the incident light beam I. The active surface S provides, by reflection, a corrected light beam I'. As is well known, such an adaptive optic may correspond to a deformable mirror whose reflection surface—that is to say the active surface S—can be locally deformed by mechanical actuators in a perfectly controlled manner. It may also be a spatial light modulator (SLM) wherein a matrix of liquid crystals arranged on a reflective active surface is controlled to spatially modify its refractive index and thus locally modify the phase of the reflected beam. According to another possible alternative embodiment, the adaptive optic is a one- or two-dimensional grating light valve.

Regardless of the nature of the chosen adaptive optic, the active surface S of that optic AO is controllable to locally modify the phase of the beam reflected therein, and this property is utilized in the context of the present description to at least partly compensate for the deformation of the wavefront of the incident beam I, and thus form the corrected light beam I'. For the sake of simplicity of expression, "deformation of the active surface" will be understood to mean controlling the adaptive optic AO leading to spatially modifying the phase of the reflected beam, that this control is aimed at effectively deforming a mirror or modifying the refractive index of a matrix of liquid crystals. It will naturally be possible for the adaptive optic AO to include a plurality of devices, deformable mirrors or SLMs, for example, each having a controllable active surface S. These devices are then arranged relative to each other so that the incident beam I propagates and reflected on each of the active surfaces S. The adaptive optic AO can also comprise other optical pieces, such as fixed or orientable mirrors, to guide the propagation of the incident I or corrected light beam I'.

Continuing the description of the compensating system 1 of FIG. 3A, the compensating system 1 also comprises a mode splitter 2 arranged in the propagation path of the corrected light beam I'. This mode splitter 2 therefore receives, at the input, the corrected light beam I'. The mode splitter 2 breaks down this light beam I' spatially and supplies, at the output, a plurality of output light beams $I_1$-$I_N$ conforming to a family of target modes.

Figure 3B:
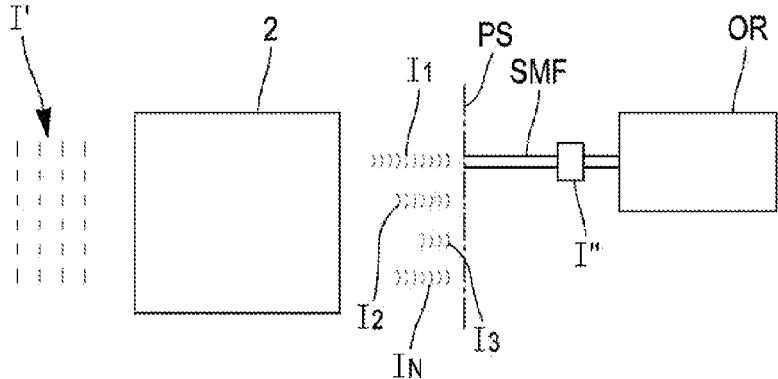

According to one embodiment, one of the output beams $(I_1)$, designated the "main" beam, constitutes the useful beam I" injected at least partially into the SMF single-mode fiber via the photonic device 3. In this case, this part of the main light beam $I_1$ is spatially separated in an output plane PS of the other output light beams $I_2$-$I_N$, in order to allow this coupling to the single-mode fiber. This embodiment is illustrated in FIG. 3B, wherein it is omitted to represent the photonic device 3 for more visibility. It can be seen that in this embodiment, the output light beams $I_2$-$I_N$ other than the main beam $I_1$ can spatially overlap (see the reference output light beams $I_2$ and $I_3$ in FIG. 3B). It should be noted that it is not necessary for the entire main light beam $I_1$ to be spatially separated from the others, and only a part of this beam can be spatially separated and injected into the single-mode fiber SMF.

Figure 3C:
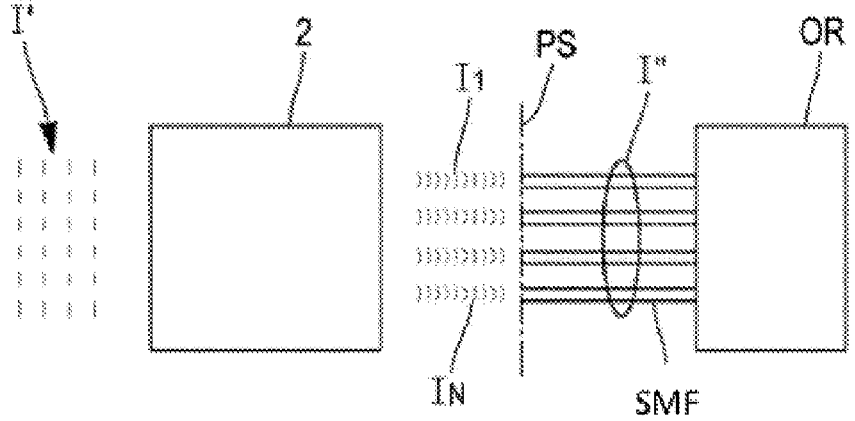

According to another embodiment, a plurality of output beams $I_1$-$I_N$, or even all the output beams, are used to form the useful beam I". As an example illustrated in FIG. 3C, this plurality of beams $I_1$-$I_N$ can be injected (for at least part of their energy) into a plurality of single-mode optical fibers SMF to guide these output beams to the optical receiver OR and to be collectively used therein. In this case, the plurality of beam guided by the SMF fibers forms, in combination, the useful beam I". According to another example, the plurality of output beams $I_1$-$I_N$ may be recombined (for at least part of their energy) to form a useful beam I" propagating in a single-mode fiber to the optical receiver OR. In this embodiment, the output light beams $I_1$-$I_N$ that are used to form the useful light beam I" are advantageously all separated spatially from one another in an output plane PS of the mode splitter 2, in order to allow different processing for each one. This plurality of output light beams $I_1$-$I_N$ may correspond to all the output light beams $I_1$-$I_N$ of the splitter 2.

According to an advantageous embodiment, only part of the output beams $I_1$-$I_N$ can be utilized to form the useful beam I". It is then possible to choose to break down the corrected beam into a large number n of output beams, for example, 100 or more, but to use only a reduced number of these beams, for example, 10 or 5, in order to limit the complexity of their processing, for example, their recombination. In some cases, all of the output beams can be used to take a measurement (phase and/or intensity) thereof, but only some can be used for their recombination. It should be noted that when the system is properly locked, a large share of the energy of the corrected beam I' may be comprised in this limited number of output beams. It can thus be provided that the number of output beams utilized is either 5 times lower or 10 times lower than the total number N of output beams $I_1$-$I_N$.

The mode splitting is advantageously implemented by a multi-plane light conversion (HPLC) device. In such an embodiment, the corrected light beam I' undergoes a succession of reflections and/or transmissions, each reflection and/or transmission being followed by free-space propagation of the beam. At least some of the optical pieces on/through which the reflections and/or the transmissions take place, and that guide the propagation of the corrected light beam I' in the mode splitter 2, have microstructured zones, which modify this light beam.

The term "microstructured zone" means that the surface of the optical piece has on each of these zones a relief, which can be, for example, broken down in the form of "pixels" whose dimensions may be between a few microns and a few hundred microns. It may be metasurfaces. The relief or each pixel of this relief has a variable elevation with respect to a mean plane defining the surface in question, of at most a few microns or at most a few hundred microns. Regardless of the nature of the microstructuring of the zones, an optical piece having such zones forms a phase mask introducing a local phase shift within the transverse section of the beam that is reflected there or transmitted there.

Thus, the light beam that propagates within the mode splitter 2 undergoes a succession of local phase shifts separated by propagations. The succession of these elementary transformations (for example, at least four successive transformations such as 8, 10, 12, 14, or even at least 20 transformations, for example) establishes an overall transformation of the spatial profile of the beam. It is thus possible to configure the microstructured reflection or transmission zones to break down and transform the corrected light beam I' into a plurality of so-called "output" beams, the spatial arrangement of which can be very precisely controlled in an output plane of the converter.

The documents "*Programmable unitary spatial mode manipulation*," Morizur et al., *J. Opt. Soc. Am. A/Vol.* 27, No. 11/November 2010; N. Fontaine et Al, (ECOC, 2017), "Design of High Order Mode-Multiplexers using Multiplane Light Conversion"; U.S. Pat. No. 9,250,454 and US2017010463 contain the theoretical foundations and examples of practical implementation of an MPLC device.

As shown in detail in these documents, the microstructured zones borne by the optical component(s) forming the mode splitter 2 are designed and configured to operate modal conversion aimed at respectively transporting the energy part of the corrected light beam I' present in a family of modes called "input" modes to the family of "target" modes. It is a passive device, whose transfer function is particularly stable and robust.

By way of example, the family of input modes may comprise a Hermite-Gauss mode base. Alternatively, a base consisting of "irregular" modes can be chosen, that is to say that the spatial Fourier transform (in the transverse plane to the propagation) of each mode of the base is distinct from the mode itself. Thus, it is possible to form a family of input modes from the typical shapes of the incident beam I or the corrected beam I' measured at the inlet of the mode splitter 2: these typical shapes, which cannot be perfectly described formally, constituting in some way categories of atmospheric disturbances traversed by the incident beam I. The observation of the shape of the incident I or corrected light beam I' at the inlet of the mode splitter 2 can make it possible to identify these typical shapes, to choose them and to process them by orthonormalization to make a so-called "irregular" base for breaking down any corrected light beam I'. It should be noted that, for this design phase, it is possible to receive the incident beam I at the inlet of the mode splitter 2, by configuring the active surface S of the adaptive optic in the "rest" position wherein it does not locally modify the phase of the incident beam I', and transmits it by reflection without modification to the splitter 2.

The family of target modes can be chosen very freely according to the nature of the processing carried out by the photonic device 3 aimed at establishing the useful light beam I" and of establishing the mode characteristics of at least some of the output light beams I1-IN. They may in particular comprise, for example, and as will be illustrated later, a Gaussian mode base or a Walsh mode base.

In general, it is sought to define target modes that are the highest and varied possible: it is possible to establish the mode characteristics of the output light beams $I_1$-$I_N$ that conform to these target modes having a wide variety, which facilitates the implementation of the regulation of the adaptive optic AO. Thus, and preferentially, the families of modes will be defined so that they have a number N of modes at least equal to 6 modes, and typically several tens of modes, and up to a hundred modes.

In the search for high and varied target modes, provision may in particular be made for the family of input modes and the family of target modes to each comprise at least two mode bases, these at least two bases being different from one another. The number N of output beams $I_1$-$I_N$ and, especially, there is a greater variety of target modes to which the output beams are formed, which makes it possible to improve the quality of the regulation, as already noted. This approach can be implemented by forming the mode splitter of two MPLC each receiving a part of the corrected beam I'.

In all cases, and whatever the way with which the corrected light beam I' has been processed, there is at the outlet of the mode splitter 2 a number N of output light beams $I_1$-$I_N$ respectively conforming to modes of a family of predetermined target modes.

Returning to the general object of the present description, and still with reference to FIG. 3A, a compensating system 1 according to the present disclosure further comprises a photonic device 3 optically coupled to the mode splitter 2 to receive the output light beams $I_1$-$I_N$. Provision may be made to provide the mode splitter 2 with optical fibers to perform this coupling or to ensure that it is propagated in free space. This photonic device 3 has a dual function.

The first function of the photonic device 3 has already been mentioned, to form a useful light beam I", representative of the corrected light beam I', from the output light beams $I_1$-$I_N$ or from a part of them. This useful beam I" is intended to be transmitted to an optical receiver OR as shown in the example of FIG. 2, and in FIGS. 3B and 3C.

Figure 4A:
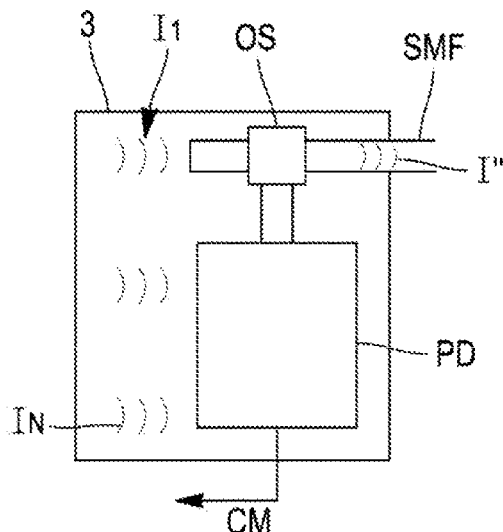
FIGS. 4A-4C represent different embodiments of a photonic device of a compensating system according to the present disclosure.

Thus, according to a first approach shown in FIG. 4A, the useful light beam I" is formed of at least a single output light beam $I_1$, for example, the one conforming to the fundamental mode of the family of target modes, typically having a Gaussian shape. This single light beam $I_1$ may be injected into a single-mode fiber SMF of the photonic device 3, in order to guide it toward the optical receiver OR. It may be provided to extract, at the photonic device 3, for example, by way of a passive fiber splitter OS of this device, a very reduced part of this light beam $I_1$, in order to measure the characteristics (intensity and/or phase, for example) as will be apparent in the rest of this description. Alternatively, all the energy of this single light beam $I_1$ forms the useful light beam I" and is transmitted to the optical receiver OR. In such a case, the passive fiber splitter OS of FIG. 4A is not necessary and it is possible to provide as replacement, and optionally that the optical OR measurement receiver and provide, by a return channel R shown in FIG. 3A, the mode characteristics of the useful beam I" or some of them (the intensity, for example).

Figure 4B:
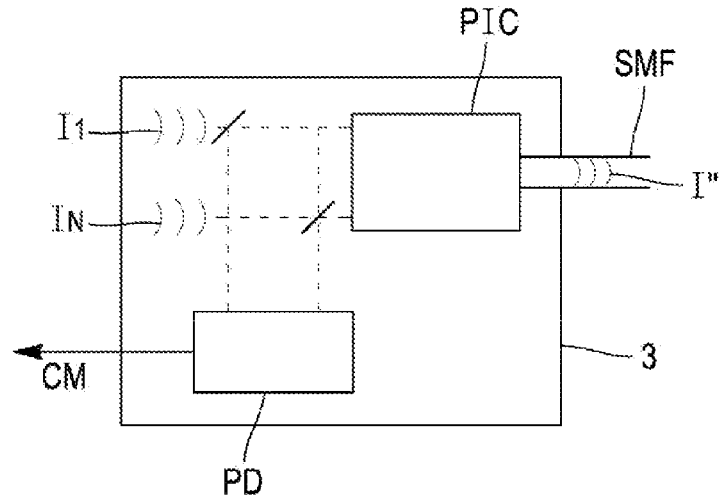
Figure 4C:
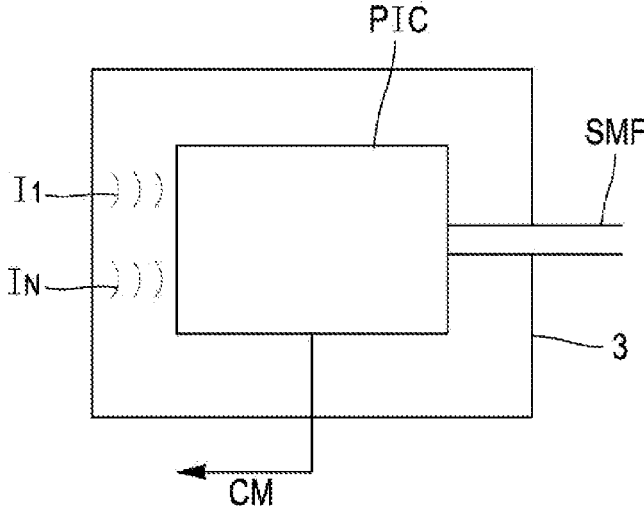

According to another approach shown in FIG. 4B, the useful beam I" is formed of the recombination of the output beams $I_1$-$I_N$ or of a part of them. This recombination can be obtained by a photonic integrated circuit PIC of the photonic device 3. This photonic circuit PIC, as is well known per se, is configured to propagate and recombine the output light beams $I_1$-$I_N$, or a part of them, as well as phase actuators of these beams making it possible to adjust their relative phase and ensure this recombination as accurately as possible. The useful beam I" recombining the light beams, just like in the preceding approach, can be injected at the output of the photonic device 3 into an SMF single-mode fiber of this device 3 to be guided toward the optical receiver OR and be utilized therein. In this approach, it may also be provided to take a very small portion of the output light beams, before their recombination, in order to measure the characteristics thereof (for example, the intensity and, optionally, the phase). In this case semi-reflective blades or any other optical element can be provided to remove the small portion of these beams. Alternatively, and according to a particular embodiment represented in FIG. 4C, these measurements or part of them can be made by the photonic integrated circuit PIC itself.

Other optical devices that a photonic integrated circuit PIC can be provided to carry out this recombination of the output light beams, in addition to or as a replacement for this circuit. Provision may in particular be made for this recombination to be implemented by one or a plurality of multi-plane light conversion devices configured to carry out this recombination.

The second function of the photonic device 3 is to process at least part of the output light beams $I_1$-$I_N$, to establish and provide quantities, designated "mode characteristics" CM in this application, representative of the characteristics of the output beams, for example, of the intensity and/or, of the relative phase of these beams or of a combination of these beams. Characteristics other than the relative intensity and phase of these beams $I_1$-$I_N$, or a part thereof can be measured, for example, a modulation frequency. But, preferably, these characteristics comprise the intensity and, optionally, the phase of the output light beams $I_1$-$I_N$, or of some of them or of a combination of at least some of these beams. These quantities are intended to be used by the controller 4 of the adaptive optic AO, in order to adjust the deformation of the active surface S of this optic in a regulation loop aimed at compensating the distortion of a wavefront of the incident light beam I. It will be recalled in this regard that, generally, the intensity and the phase of a light beam are each described by a field of quantities (or a single complex field) in the plane transverse to the propagation of the field. In the present case, each of the output light beams $I_1$-$I_N$ conforming to a target mode of a family of modes, the intensity and the relative phase of each beam $I_1$-$I_N$ can be represented, respectively, by scalar quantities. For the phase, the phase can be measured relative to a reference output light beam, for example, the one corresponding to the fundamental mode of the mode family, the reference by convention is $I_1$.

In its simplest version, the photonic device 3 comprises a measurement circuit PD composed, for example, of photodetectors making it possible to measure only the intensity of the output light beams $I_1$-$I_N$ in the form of an electrical quantity. The measurement circuit PD may be provided in the form of a photonic integrated circuit or a combination of discrete circuits. This measurement vector can be provided to the controller 4, in an electrical form, as measured by the photodetectors, or digital form, after conversion. These intensity quantities can be conditioned by the measurement circuit PD, for example, by filtering and/or amplification or any other form of processing, to make them compatible with the controller 4. It is advantageous in the case where only the intensity is measured (and not the relative phase), to have a relatively large number of output light beams, for example, by breaking down the corrected light beam I' into several families of input and target modes, as has already been mentioned. As already mentioned, it is not necessary for the measurement circuit PD to establish a measurement of the intensity of each of the output light beams $I_1$-$I_N$. For example, in the case where one of these beams is entirely utilized to form the useful beam I" propagated via the waveguide SMF to the optical receiver OR, the measurement circuit PD then does not establish the mode characteristic(s) of that light beam. It can nevertheless be provided, and as has already been specified, that such characteristic(s) are established by the optical receiver OR itself, and provided via a return channel R to the photonic device 3 OR directly to the controller 4.

According to a particular embodiment of the measuring circuit PD, the latter is able to establish the intensity and the relative phase of the output light beams $I_1$-$I_N$. This measurement circuit therefore establishes a vector of measurements representative of the intensity and of the relative phase of the output light beams $I_1$-$I_N$ or of a part thereof. This can be obtained by measuring the intensity, again by way of example via a photodetector, of an interference signal of the two output light beams whose relative phase is to be measured. However, any other circuit for measuring the relative phase may be suitable.

According to another particular embodiment already mentioned above and shown in FIG. 4C, the mode characteristics (for example, the intensity and, optionally, the phase of the output light beams) are produced by the photonic integrated circuit PIC recombining at least some of the output light beams $I_1$-$I_N$. It is then possible to take advantage of the phase actuators of this circuit PIC to determine the relative phase characteristics of the various beams.

It should be noted that the mode characteristics developed by the photonic device 3 do not necessarily relate to output beams $I_1$-$I_N$ spatially isolated from each other, and some of these characteristics can be obtained by measuring output beams $I_1$-$I_N$ that spatially overlap in the measurement plane.

An example of such a configuration is illustrated with reference to FIG. 5A. The mode splitter 2 is here formed of two MPLCs 2a, 2b. A beam splitter BS of the splitter 2 is arranged upstream of the two MPLCs 2a, 2b to provide a majority 1−ε of the corrected beam energy to the first MPLC 2a and a small part c of the energy of this beam I' to the second MPLC 2b.

The first MPLC is configured to break down the portion of the incident beam I' according to a Hermite-Gauss family of modes. Two modes HG1, HG2 are illustrated in FIG. 5A. These input modes are respectively transformed by the first MPLC 2a in the Gaussian target modes G1, G2 forming a family of spatially separated Gaussian target modes. For more visibility, shown on two separate cartridges C1, C2 are the transformation carried out between the family of input modes HG1, HG2 and the family of target modes G1, G2, but it should be understood that these two cartridges are in fact superimposed. It should also be understood that only two modes are shown here, but that more generally the transformation is carried out by the first MPLC 2a over a greater number of modes.

Figure 7:
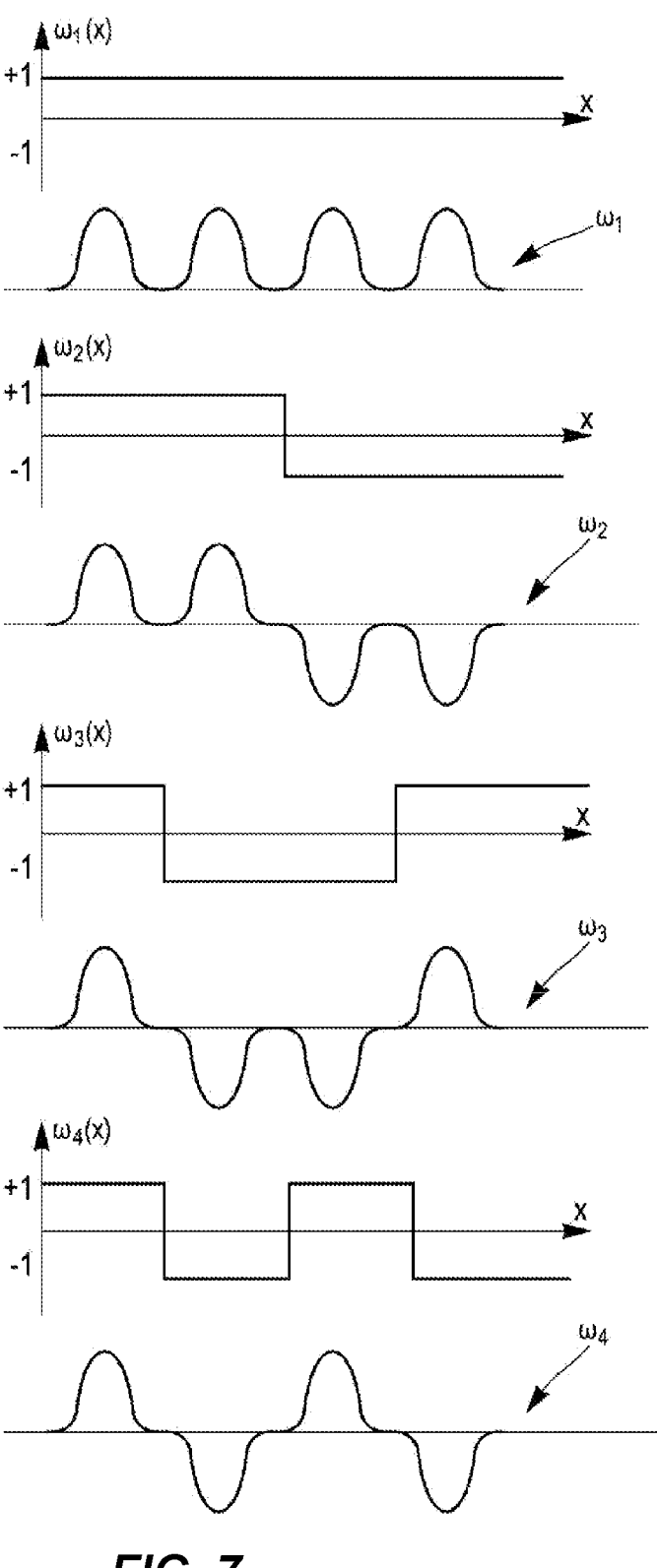
FIG. 7 shows the design of a Walsh mode family.

The second MPLC 2b is configured to associate respectively the modes of a family of input modes HG1, HG2 identical to that of the first MPLC 2a, to the modes W1, W2 of a family of target modes formed of Walsh modes. It will be recalled that the Walsh modes are modes comprising several distinct lobes, for example, Gaussian lobes. A Walsh mode family can be constructed from a base distribution respectively multiplied by the Walsh function $W_k(x)$, for k=1, 2 . . . N, as shown in FIG. 7 in the case of a family composed of four modes W1, W2, W3, W4 (in one dimension in FIG. 7, it being understood that in the context of the application these modes extend spatially). In FIG. 5A, the lobes of the first Walsh W1 mode and the lobes of the second Walsh mode W2 are superimposed. These superimposed lobes respectively generate output light beams, which overlap entirely according to two spatially separated lobes I'1, I'2.

The photonic device 3 of this example is then configured to inject the output light beams I1, I2 from the first MPLC 2a into single-mode optical fibers in order to transmit them to the optical receiver OR. It is also configured to measure (here using a plurality of photo detectors PD) and to provide quantities representative of each of the light beam I'1, I'2 respectively coming from the lobes superimposed on the two Walsh modes W1, W2. It will in particular be possible to measure the interferometric beat that occurs at the overlap of the output light beams to establish a relative phase measurement between these two beams.

Figure 5A:
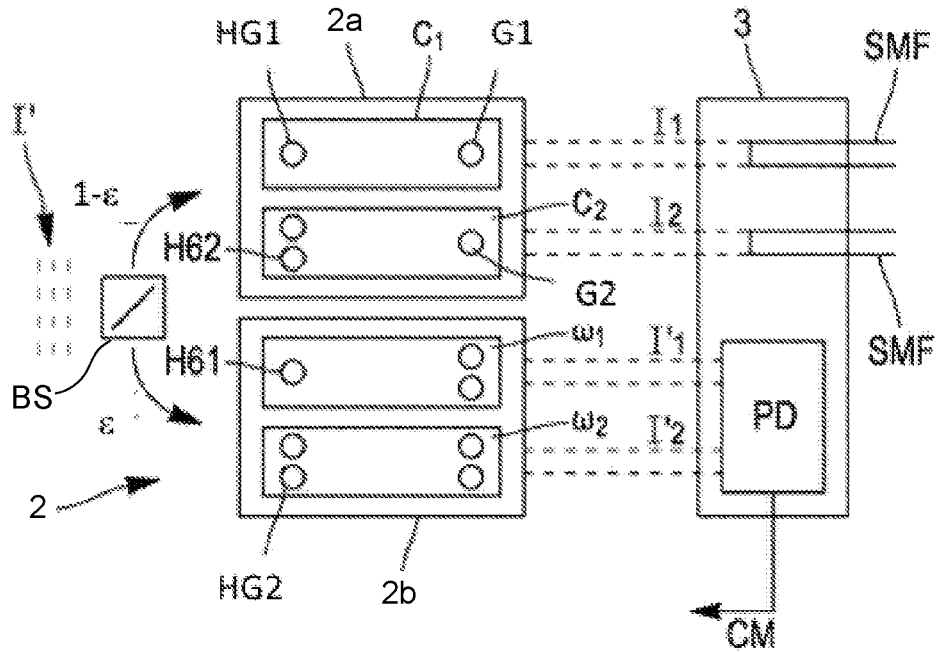
FIGS. 5A and 5B show two examples of a mode splitter according to the present disclosure.
Figure 5B:
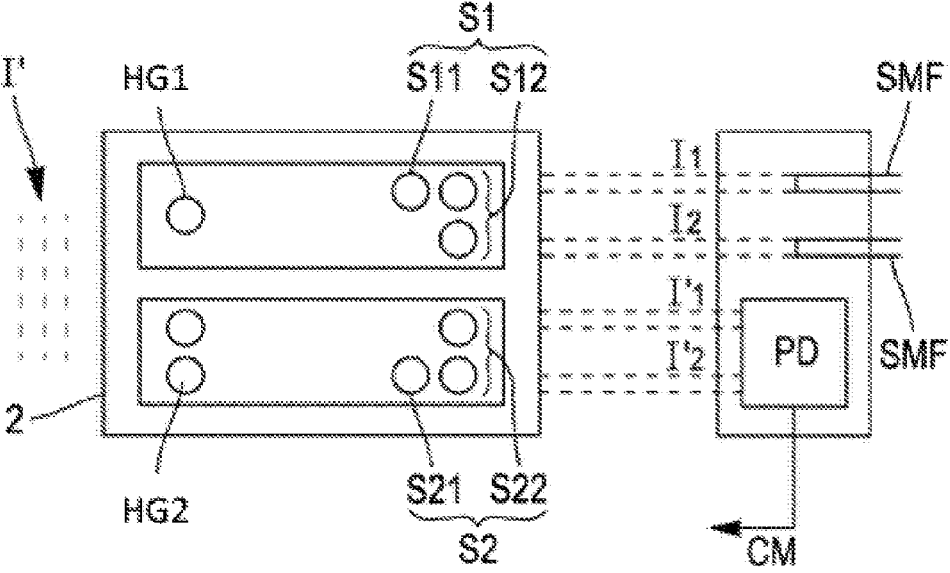

FIG. 5B shows a configuration similar to that of FIG. 5A, but which is this time implemented by a single MPLC implementing the mode splitter 2. In this configuration, the MPLC is designed from a family of Hermite-Gauss modes HG1, HG2, and from a family of target supermodes S1, S2. Each target supermode combines a Gaussian mode S11, S21 that collects a significant part of the energy decomposed according to each input mode and a Walsh mode S12, S22. The Gaussian modes S11, S21 of the supermodes S1, S2 are spatially separated from each other and from the other modes S21, S22 of the supermodes. It is therefore possible, via the photonic device 3, to inject them into single-mode optical fibers SMF, for example, to guide the output light beams I1, I2, which directs them (forming the useful light beam) toward the optical receiver OR or recombines them. As in the example of FIG. 5A, the lobes of the Walsh modes S12, S22 of the supermodes overlap entirely. The light beams I'1, I'2 that are respectively combined with these lobes can be processed by the photonic device 3, for example, by a plurality of photodetectors PD, in order to extract therefrom mode characteristics.

To summarize, the photonic device 3 therefore prepares a useful beam I" that it propagates via a single-mode optical fiber SMF to the optical receiver OR. In this respect, an amplification stage A (FIG. 3A) of the useful light beam I" can be provided in order to facilitate the utilization thereof by this receiver. The photonic device 3 may in particular be optically coupled, via one or a plurality of single-mode optical fibers to an optical amplifier of the useful light beam I", for example, an erbium-doped fiber amplifier. The photonic device 3 prepares and also supplies the mode characteristics CM of at least some of the output light beams $I_1$-$I_N$, or a combination of these beams, these mode characteristics being provided to the controller 4 of the adaptive optic AO of the regulation loop.

This controller 4 can be implemented by a signal processing computer, by a programmable logic component (FPGA) or by any other device having sufficient computing power. It is configured by hardware or by software in order to, from the mode characteristics CM, adjust the deformation of the active surface S, in the control loop aiming, for example, to maximize the power present in the useful light beam I". This is in particular the case when this useful light beam I" is formed from a single output light beam (or from a part thereof), for example, the one beam $I_1$ associated with the fundamental target mode of the family of target modes. In this case, the processing implemented by the controller 4 can also aim to minimize the power present in the other output light beams $I_2$-$I_N$. The minimization of the power present in these other beams may also form the regulation criterion of the adaptive optic when no mode characteristic of the useful light beam I" is available. This may in particular be the case when the useful light beam I" is formed from the whole energy of the output beam $I_1$ and when the optical receiver does not provide, via the return channel R, mode characteristics of the useful beam.

By way of example, the processing implemented by the controller to perform this optimization step can be based on a gradient method, on a stochastic method, on an interpolator configured by learning, for example, a neural network, on an interpolator configured by fuzzy logic, or more conventional methods of regulation, for example, Kahlman, which are adaptive or robust implementing the creation of a state model of the controlled system, fixed or determined in real time by identification.

According to a particularly interesting embodiment aimed at enriching the regulation data, in particular when it is sought to develop a real time model of the system regulated, the adaptive optic AO is controlled, for example, by the controller 4 or by the photonic device 3, to apply a temporary determined deformation to the active surface S. It may be, for example, to apply a deformation to this surface S consisting of a phase bias that is constant, spatially, to the incident beam I. It may alternatively be a phase bias having a determined profile, which may be chosen randomly or not. This phase bias temporarily applied, during a determined period, on the corrected beam I' affects the mode characteristics CM of the output light beams $I_1$-$I_N$ during the period during which it is applied. In this case, the photonic device 3 is configured to measure the quantities representative of the intensities and/or the relative phases of the output light beams I' produced with (during the period where the deformation is applied to the adaptive optic AO) and without the temporary deformation of the active surface S (before or after this period). In this case, the photonic device 3 is also configured to combine these mode characteristics CM in an enriched measurement vector, which can be provided to the controller 4 in order to improve the quality of the regulation.

When both the quantities representative of the intensity and of the relative phase of the output light beams $I_1$-$I_N$ are available, the controller 4 can be configured to determine, from these mode characteristics CM, the phase of the wavefront of the part of the corrected light beam I'. Indeed, this information is sufficient to make it possible to reconstruct the transverse electromagnetic field forming the corrected light beam I', since the transformation carried out by the mode splitter 2 is entirely determined by the choice of the families of input modes and targets. From this transverse electromagnetic field, it is possible to extract the wavefront of the corrected light beam I' and therefore its distortion, for example, in the form of a matrix of scalar values whose resolution corresponds to the deformation resolution of the adaptive optic AO. It is then easy to determine, according to this deterministic approach, the adjustment of the deformation of the active surface S of the adaptive optic AO compensating for this distortion.

Figure 6:
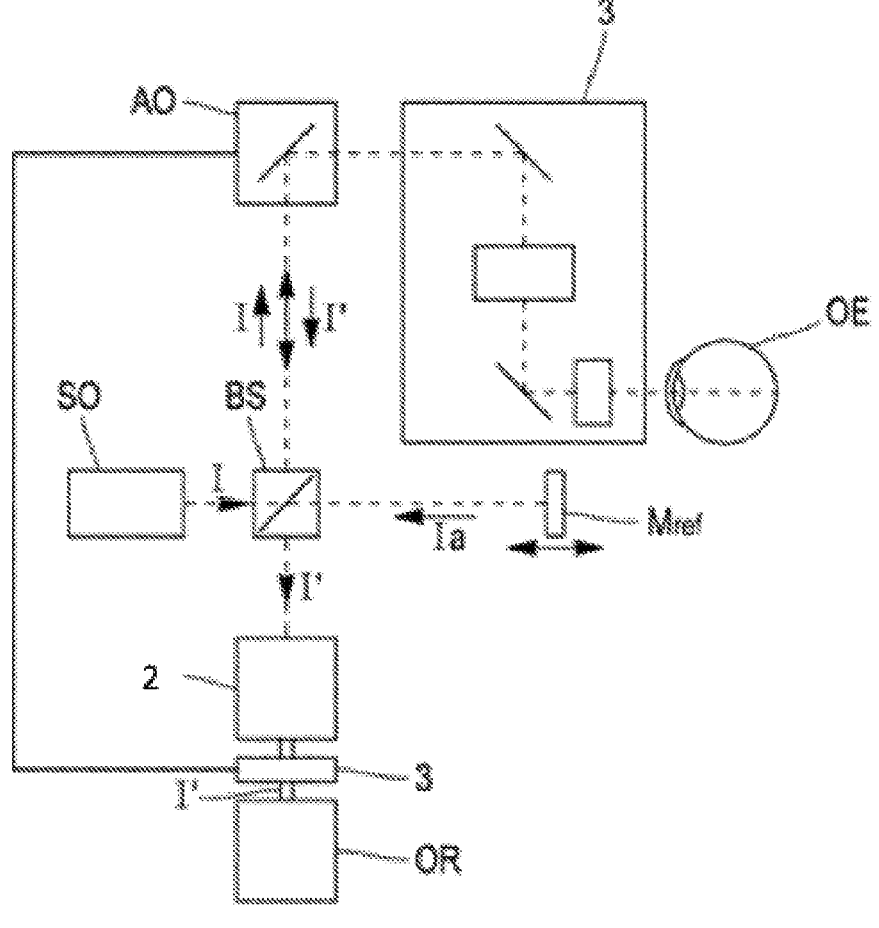
FIG. 6 shows a second example of use of a compensating system according to the present disclosure in the field of medical imaging.

Referring to FIG. 6, a second example of use in the field of medical imaging of a system 1 for compensating for the distortion of a wavefront according to the present disclosure is presented. In this application, it is aimed at correcting optical aberrations of the eye, that is to say unevenness in the refraction index of the eye, by implementing an optical coherence tomography technology.

In the illustration of FIG. 6, it is desired to image the background of an eye OE. To this end, the ophthalmological system comprises a light source SO, typically with low coherence and, for example, based on superluminescent diodes. The light beam produced by this source is guided, according to a first path, to a scanning device B, here comprising two mobile mirrors and a set of lenses, making it possible to scan the background of the eye in order to image the eye. An adaptive optic OA is arranged on the optical path separating the source SO and the eye OE. The incident beam I produced by the source is reflected on this eye bottom and on the adaptive optic to provide corrected beam I' and be directed toward an OR detector. The wavefront of the reflected beam I' toward the detector has a wavefront whose profile has been affected by the unevenness of the refractive index of the eye. It therefore has a time-varying distortion depending on the point targeted by the scanning device B.

The light beam produced is also guided, via a beam splitter BS, according to a second so-called reference channel to a mirror Mref whose position is adjustable, and the reflected reference beam IR is also directed toward the detector OR.

As is well established in the field, the reflected incident beam I' and the reflected reference beam IR combine at the detector OR to interfere (by adjusting the position of the adjustable mirror Mref of the reference channel) and this interference makes it possible to image the back of the inspected eye.

In the ophthalmological system of FIG. 6, a system for compensating the distortion of the wavefront of the reflected incident light beam according to the present disclosure has also been provided in the first channel.

This system contains all the characteristics of the compensating system described with reference to FIG. 3A. The corrected light beam I' is in particular separated moderately by the mode splitter 2 and the mode characteristics of the output light beams are measured by the photonic device 3 to control the deformation of an active surface of the adaptive optic AO. At least one of the output light beams is used to form the useful beam I" intended to interfere with the reference reflected beam at the detector. The latter forms an optical receiver OR making it possible to detect the interference position of the reference mirror Mref and, in this application, image the background of an eye OE, at least partially compensating the distortion created by the refractive index dispersion of this eye.

In an alternative to the configuration shown in FIG. 6, the source could also consist of a tunable laser whose wavelength is scanned over a whole range to measure characteristic interference spectral fringes of the background of the eye for each of the positions of the beam. It is no longer necessary to have the mirror Mref, and the splitter B S may be a fiber splitter.

It is therefore understood more generally that a compensating system 1 according to the present disclosure can be utilized to compensate for the distortion created on a light beam by its propagation medium. This medium is in no way limited to the atmosphere in free-space transmission applications. It may in particular be a wet medium, for example, for underwater transmissions, or through biological tissue in medical applications, such as that presented briefly above. The system can also find an application in the field of microscopy, in particular of the confocal or non-linear type.

Naturally, the present disclosure is not limited to the embodiments described, and it is possible to add alternative embodiments without departing from the scope of the invention as defined by the claims.

Thus, although the processing operations carried out on the corrected light beam I' have been broken down into an architecture comprising the mode splitter 2, the photonic device 3 and the controller 4, it is understood that other architectures carrying out identical processing operations are possible. Provision may in particular be made for the photonic device 3 and the controller 4 to be integrated with one another to form a single device. More generally, certain associated functions (to simplify the description) to a particular device can be carried out by another device, without this design choice separating the system of the present disclosure as a whole, as the invention is defined by the claims.

The Gaussian and Walsh modes of the mode splitter 2 taken as an example are only given by way of illustration. It would be possible to choose other modes than those of Gauss to form the family of input modes and other modes than those of Walsh to constitute the family of output modes. It may thus be a collection of generalized Hadamard output modes, corresponding to a transform of the input modes based on a complex Hadamard matrix. It may be, for example, a discrete Fourier transform of the input modes. Thus, for the j-th input mode (from N input modes), the associated output mode may consist of N lobes, for example, Gaussian lobes, for which the phase of the k-th lobe is equal to:

$$\phi_{j,k} = \frac{2\pi jk}{N}.$$

Finally, it should be noted that the compensating system 1 can also be useful for characterizing disturbances of the medium, for example, of an atmospheric nature when the application involves a transmission in free space. In this case, the adaptive optic is not implemented, and the mode splitter therefore receives the incident beam I uncorrected. The mode characteristics established by the photonic device 3 in this case form a signature of the incident beam, in particular of its shape. This signature can be saved to form a library of signatures of atmospheric disturbances. Such a library can be utilized by scientific or technological purposes, for example, to define a typology of atmospheric disturbances.

The invention claimed is:

1. A compensating system for compensating for distortion of a wavefront of at least part of an incident light beam, the compensating system comprising:
    an adaptive optic comprising an active surface configured to receive the at least part of the incident light beam and provide, via reflection from the active surface, a corrected light beam;
    a mode splitter disposed in a propagation path of the corrected light beam, configured to provide a plurality of output light beams conforming to a family of target modes, the mode splitter comprising a plurality of microstructured zones disposed on at least one optical element configured to spatially intercept and modify the corrected light beam, during a plurality of reflections or transmission from the plurality of microstructured zones separated by a free propagation;
    a photonic device optically coupled to the mode splitter, the photonic device being configured to provide:
        i. a useful light beam representative of the corrected light beam, from the plurality of output light beams, the useful light beam being intended in to be transmitted to an optical receiver; and
        ii. mode characteristics representative of characteristics of the plurality of output light beams; and
    a controller of the adaptive optic, connected to the photonic device and to the adaptive optic, the controller being configured to, from the mode characteristics, adjust deformation of the active surface.

2. The compensating system of claim 1, wherein the useful light beam corresponds to a part of at least a single output light beam, the part being spatially separated from the other output light beams of the plurality.

3. The compensating system of claim 1, wherein the useful light beam comprises a plurality of output light beams.

4. The compensating system of claim 3, wherein the photonic device is configured to recombine at least part of the output light beams to form the useful light beam.

5. The compensating system of claim 4, wherein the recombination of at least part of the output light beams is carried out by at least one multi-plane light conversion device.

6. The compensating system of claim 4, wherein the recombination of at least part of the output light beams is carried out by a photonic integrated circuit.

7. The compensating system of claim 1, wherein the photonic device comprises at least one single-mode optical fiber and is configured to inject the useful light beam into the at least one single-mode optical fiber.

8. The compensating system of claim 1, wherein the photonic device comprises a plurality of photodetectors configured to measure intensity at least a part of the plurality of output light beams, the plurality of photodetectors providing at least some of the mode characteristics.

9. The compensating system of claim 8, wherein the plurality of photodetectors are further configured to measure a relative phase of the at least a part of the plurality of output light beams.

10. The compensating system of claim 1, wherein the mode characteristics comprise quantities representative of intensity and relative phase of the output light beams and the controller is configured to determine, from mode characteristics, the phase of the wavefront of the part of the corrected light beam.

11. The compensating system of claim 1, wherein the controller implements a processing aimed at configured to maximize a power transmitted in the useful light beam.

12. The compensating system of claim 1, wherein the family of target modes comprises a Gaussian mode base and/or a generalized Walsh and/or Hadamard mode base.

13. The compensating system of claim 1, wherein the mode splitter comprises a plurality of multi-plane light conversion devices.

14. The compensating system of claim 1, wherein the adaptive optic is configured to apply a temporary determined deformation to the active surface, and the mode characteristics combine quantities representative of the characteristics of the output light beams produced with and without the temporary deformation of the active surface.

15. The compensating system of claim 1, wherein the photonic device is optically coupled to an optical amplifier of the useful light beam.

16. An optical communication system including a compensating system according to claim 1, wherein the optical communication system is configured to implement a wavelength multiplexing and/or polarization multiplexing process.

* * * * *